May 1, 1962 P. H. MEYER ETAL 3,031,818
PREWRAP DEVICE
Filed April 16, 1959 2 Sheets-Sheet 2
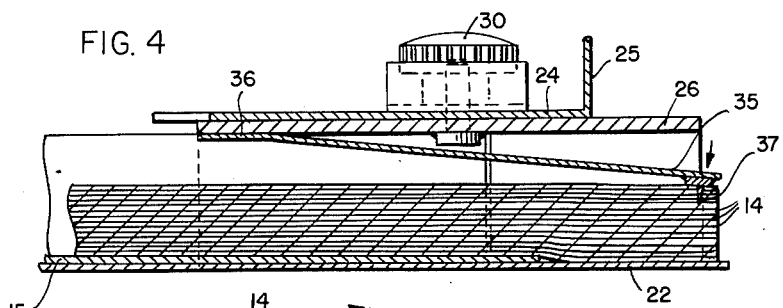
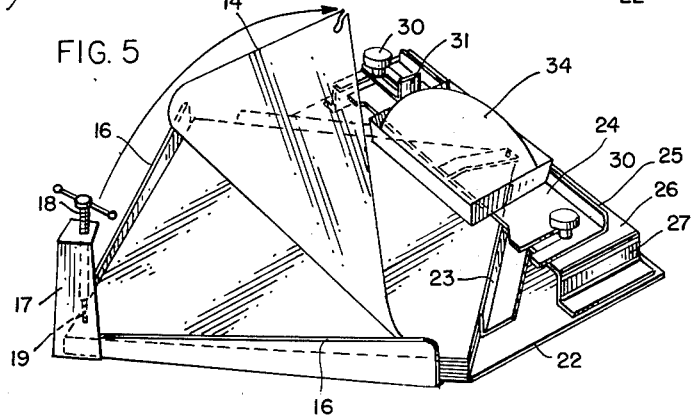
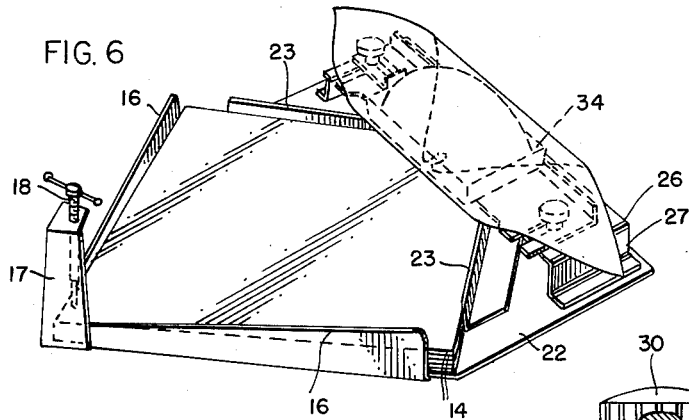
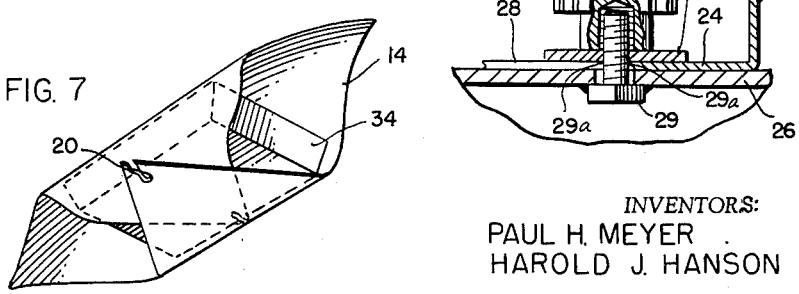
INVENTORS:
PAUL H. MEYER
HAROLD J. HANSON
BY Marzall, Johnston, Cook & Root
ATT'YS United States Patent Office 3,031,818
Patented May 1, 1962

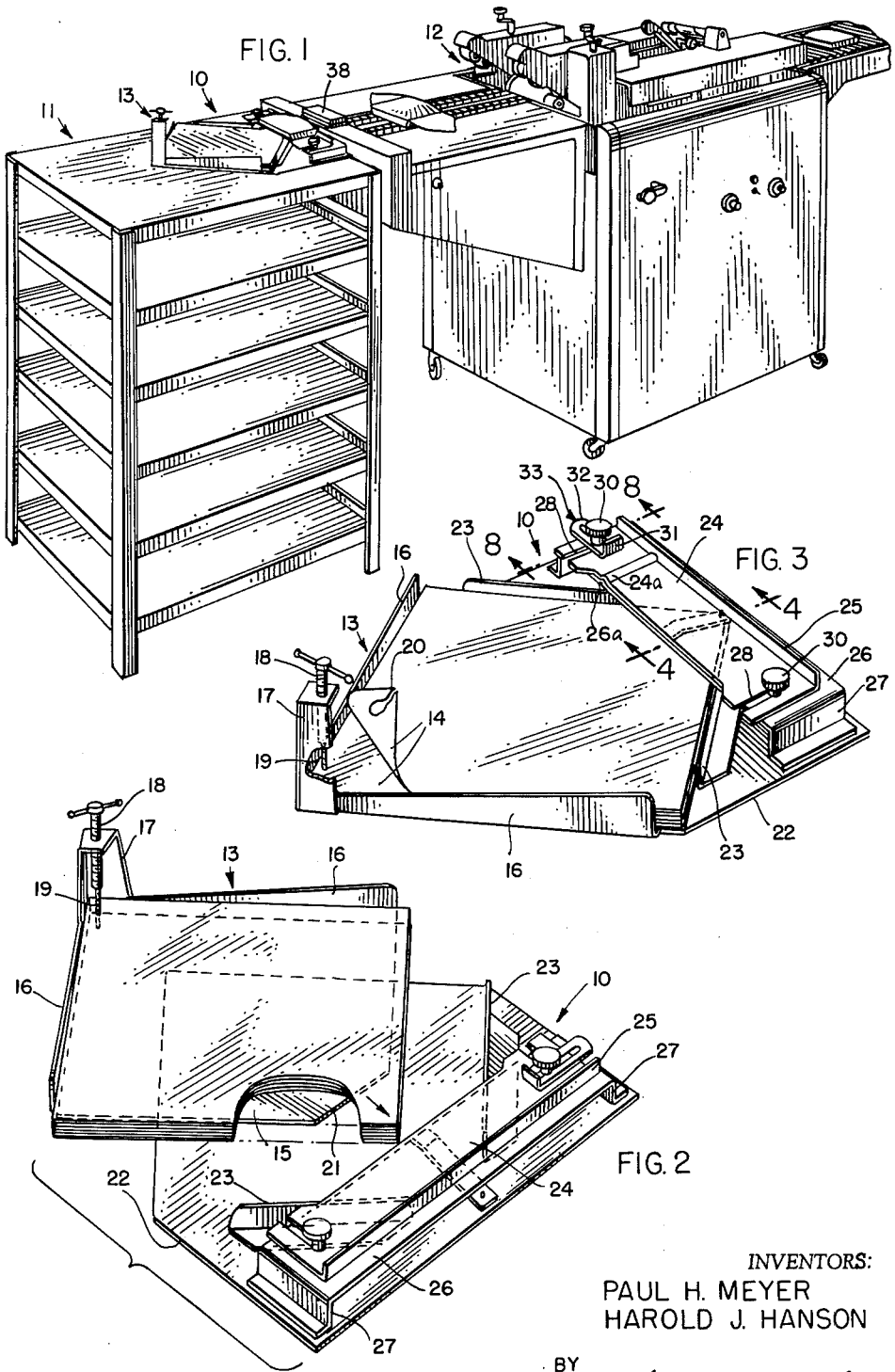

3,031,818
PREWRAP DEVICE
Paul H. Meyer and Harold J. Hanson, La Porte, Ind., assignors to Naamlooze Vennootschap-Maatschappij Tot Vervaardiging Van Snijmachines Volgens Van Berkel's Patent en Van Andere Werktuigen, Rotterdam, Netherlands, a company of the Netherlands
Filed Apr. 16, 1959, Ser. No. 806,824
6 Claims. (Cl. 53—206)

This invention relates in general to the prewrapping of articles, and more particularly to a prewrap device facilitating the prewrapping of articles.

The prewrap device of the present invention is specially useful in prewrapping edible foods, such as poultry, fresh meats, produce, cold meats and cheeses, on boards, cards, pans or trays, prior to feeding of a prewrapped article to a wrapping machine which completes the wrapping operation. The boards, cards, pans or trays are preferably constructed of a pulp board, or other suitable material, and serve to support or partially contain the edible foods thereon, wherein a sheet of wrapping material may be wrapped around the food and the supporting member and tightly sealed thereto. Preferably, the wrapping material will be of a transparent type, such as cellophane or Pliofilm. Accordingly, a wrapped food may be sold on selfservice counters in supermarkets or the like.

The prewrap device of the present invention serves to facilitate the performing of the first step of the well-known "diamond wrap" or "square wrap" as applied to an article.

Accordingly, it is an object of this invention to provide a prewrap device for facilitating the prewrapping of articles, wherein the device may be easily and economically manufactured and permit quick and easy prewrapping of articles.

Another object of this invention resides in the provision of a prewrap device for facilitating execution of the first step of wrapping articles by the "diamond wrap" or "square wrap" method at a high rate of speed.

Still another object of this invention is in the provision of a prewrap device for prewrapping articles, wherein the device is adjustable for the handling of various sizes and shapes of goods.

A further object of this invention is to provide a prewrap device that is adjustable and constructed so that it is extremely easy for the operator to use in effecting prewrapping of articles.

Other objects, features, and advantages of the invention will be apparent from the following detailed disclosure, taken in conjunction with the accompanying sheets of drawings, wherein like reference numerals refer to like parts, in which:

FIG. 1 is a perspective view of a prewrap table arranged adjacent to a wrapping machine, and a prewrap device according to the invention supported on the prewrap table;

FIG. 2 is a perspective view, with some parts broken away to show underlying parts of the prewrap device according to the present invention and its relation to a tray of wrapping paper where the tray is removed from the device;

FIG. 3 is a perspective view of the prewrap device according to the present invention with a tray filled with wrapping sheets in position relative thereto;

FIG. 4 is an enlarged detail sectional view, taken substantially along line 4—4 of FIG. 3;

FIG. 5 is a view similar to FIG. 3, but illustrating an article in position and the initiation of the wrapping procedure;

FIG. 6 is a view similar to FIG. 5, but illustrating one step further in the wrapping of an article supported on the prewrap device;

FIG. 7 is a bottom perspective view of an article prewrapped in accordance with the present invention; and FIG. 8 is an enlarged detail sectional view, taken substantially along line 8—8 of FIG. 3.

Referring now to the drawings, and particularly to FIG. 1, the prewrap device of the present invention, generally designated by the numeral 10, is illustrated as being supported on a prewrap table 11 positioned adjacent the infeed end of a wrapping machine 12. The wrapping machine 12 does not form any part of the present invention and may be of any particular type which serves to complete the wrapping of an article prewrapped by use of the prewrap device 10. The prewrap device 10 is shown in association with a tray 13 which holds a stack of sheets 14 of wrapping material of any desired size. The wrapping material may be of any suitable type, but preferably transparent and capable of being heat sealed. Satisfactory wrapping material includes cellophane and Pliofilm.

The tray 13 which holds the rectangular sheets 14 of wrapping material includes a bottom plate 15 of generally rectangular shape having upstanding flanges 16 along two of the adjacent edges for defining stops or locating means to properly locate the stack of wrapping sheets on the bottom plate 15. At the junction of the flanges 16, an upstanding bracket 17 is provided which threadedly receives a vertically extending bolt 18 having a drill or piercing element 19 secured thereto for piercing the corners of the wrapping sheets adjacent the bracket 17 and temporarily holding the wrapping sheets to the tray 13. When removing a sheet of wrapping material 14 from the tray 13, the corner of the sheet held by the piercer 19 is slightly torn as at 20, FIG. 3, which is not undesirable, nor does it affect the wrapping operation. The bottom plate 15 is sized so that the outer free edges of the sheets of wrapping material extend slightly beyond the edges of the plate as seen particularly in FIG. 2, and the outer corner of the bottom plate 15, opposite the bracket 17 is cut away at 21.

Referring now to FIGS. 3 to 8, the prewrap device 10 includes a base plate 22 adapted to rest on top of the prewrap table 11. A pair of coacting upstanding guide flanges 23 are suitably secured to the base plate 22 in angular relation to each other for locating the stack of wrapping sheets on the base plate. The wrapping sheets may be rectangular or may take the form of a parallelogram, the guide or locating flanges 23 being arranged accordingly in order to properly engage the free edges of the wrapping sheets, as seen in FIGS. 3, 5 and 6. The shape of the left hand end of the base plate, viewed in FIG. 2, is substantially the same as the tray 13 in order to provide proper coaction between the tray of sheets and the prewrap device.

Spaced above the base plate 22 is an article receiving plate 24 having an upstanding elongated article locating bar 25 at one edge and integral therewith. The article receiving plate 24 is adjustably carried on an elongated supporting member or strap 26, extending substantially the full transverse width of the base plate 22, and supported above the base plate by downwardly extending integral legs 27 that are flanged and suitably secured to the base plate 22. A pair of parallel extending slots 28 are provided in the article receiving plate at opposite ends thereof which coact with studs 29, FIG. 8, for adjustably securing the article receiving plate 24 and its article locating bar 25 to the support member 26 and relative to the positioning of the wrapping sheets 14. The heads of the studs 29 are secured to the underside of the supporting member 26 and have opposed flatted sides 29a, 29a for purposes hereinafter explained. Threaded portions of the studs 29 engage nuts 30 which may be tightened and loosened by hand and bear down on the parts movable on the supporting member 26.

A second article locating bar 31 extends upwardly from a securing member 32 having an elongated slot 33 therein for coacting with one of the studs 29, whereby it may be adjustably secured over the article receiving plate 24 at one end thereof to provide a second article positioning or locating member. The locating bar 31 may be mounted on either stud 29, and the slot 33 is sized to tolerances relative to the flatted sides of the studs close enough to prevent relative turning of the locating bar with the stud. Thus, an article to be wrapped such as designated by the numeral 34 in FIG. 5 may be located against the article locating bar 25 on one side and the second article locating bar on another side to provide positive locating of the article relative to the sheets of wrapping material. Mating beads 24a and 26a, FIG. 3, may be formed in the article receiving plate 24 and the supporting member 26, respectively, to extend parallel to the slots 28 and guide movement of the article receiving plate 24 and locating plate 25 along a rectilinear path.

In order to hold the corners of each wrapping sheet 14 in position beneath the article to be wrapped and the article receiving plate 24, means is provided to temporarily clamp this corner of each sheet to the base plate 22, which includes a spring finger 35 secured to the under side of the supporting member 26 at 36 and having at the other end a piercing needle or stylus 37 for piercing the uppermost sheets of wrapping material 14 at the very corner thereof. The finger 35 is made of spring steel preferably, and will constantly exert a downwardly biasing force against the outer corners of the wrapping sheets to thereby temporarily hold the sheets in position.

As seen particularly in FIGS. 5 to 7, after the article 34 has been properly positioned on the article supporting plate 24 and against the article locating bars 25 and 31, the uppermost sheet of wrapping material 14 is torn loose from the piercing element 19 and brought over and around the article 34 as seen in FIG. 6, after which the user grasps the article with one hand by inserting his fingers beneath the article and sheet of wrapping material at the side opposite the locating bar 25 to remove the article and wrapping material from the prewrap device, at which time the outer corner of the uppermost sheet will be torn loose from the piercing needle 37. The partially wrapped article 34 will then appear as seen in FIG. 7 wherein the opposite corners overlap the under side of the article 34 and the other corners extend from opposite ends of the package to define flaps to be later tucked and folded under by the wrapping machine 12. After the article 34 has been prewrapped as seen in FIG. 7, the flaps at the under side of the article may be tack-sealed together by applicatiton of these flaps against a heated bar 38 mounted on the infeed end of the wrapping machine 12.

It will be understood that modifications and variations may be effected without departing from the scope of the novel concepts of the present invention, but it is understood that this application is to be limited only by the scope of the appended claims.

The invention is hereby claimed as follows:

1. A prewrap device for prewrapping articles comprising, a base plate, an article supporting plate mounted on said base plate and spaced thereabove, a first article locating bar adjustably carried on said article supporting plate against which one side of an article to be prewrapped may be located relative to a sheet of wrapping material, a second article locating bar adjustably carried on said article supporting plate and normally extending angularly to said first locating bar and against which another side of said article to be prewrapped may be located relative to a sheet of wrapping material, and locating means on said base plate against which a sheet of wrapping material may be located so that a part of said sheet is arranged between said plates.

2. A prewrap device for prewrapping articles comprising, a base plate, an article supporting plate mounted on said base plate and spaced thereabove, a first article locating bar adjustably carried on said article supporting plate against which one side of an article to be prewrapped may be located relative to a sheet of wrapping material, a second article locating bar adjustably carried on said article supporting plate and normally extending angularly to said first locating bar and against which another side of said article to be prewrapped may be located relative to a sheet of wrapping material, locating means on said base plate against which a sheet of wrapping material may be located so that a part of said sheet is arranged between said plates, and means clamping the part of the sheet arranged between the plates to temporarily hold same during the prewrapping operation.

3. A prewrap device for prewrapping articles comprising, a base plate, an article supporting plate mounted on said base plate and spaced thereabove in substantial parallel relation thereto, article locating means carried on said article supporting plate against which an article to be prewrapped may be located relative to a sheet of wrapping material, a tray having a stack of superimposed sheets of wrapping material, locating means on said base plate against which said stack of sheets may be located so that a part of said stack of sheets is arranged between said plates, and means clamping said part of said stack to said base plate to temporarily hold a part of each sheet during the prewrapping operation.

4. A prewrap device for prewrapping articles comprising, a base plate, an article supporting plate mounted on said base plate and spaced thereabove in substantial parallel relation thereto, article locating means carried on said article supporting plate against which an article to be prewrapped may be located relative to a sheet of wrapping material, a tray having a stack of superimposed rectangular sheets of wrapping material, locating means on said base plate against which said stack of sheets may be located so that a corner of said stack is arranged between said plates, and means clamping said corner of said stack to said base plate to temporarily hold a corner of each sheet during the prewrapping operation.

5. A prewrap device for prewrapping articles comprising, a base plate, an article supporting plate mounted on said base plate and spaced thereabove in substantial parallel relation thereto, article locating means carried on said article supporting plate against which an article to be prewrapped may be located relative to a sheet of wrapping material, locating means on said base plate against which a stack of rectangular superimposed sheets of wrapping material may be located so that a corner of each sheet is arranged between said plates, and means clamping the corner of each sheet to said base plate to temporarily hold same during the prewrapping operation.

6. A prewrap device for prewrapping articles comprising, a base plate, an article supporting plate mounted on said base plate and spaced thereabove, a first article locating bar adjustably carried on said article supporting plate against which one side of an article to be prewrapped may be located relative to a sheet of wrapping material, a second article locating bar adjustably carried on said article supporting plate and normally extending angularly to said first locating bar and against which another side of said article to be prewrapped may be located relative to a sheet of wrapping material, locating means on said base plate against which a stack of rectangular superimposed sheets of wrapping material may be located so that a corner of each sheet is arranged between said plates, and means clamping the corner of each sheet to said base plate to temporarily hold same during the prewrapping operation.

References Cited in the file of this patent

UNITED STATES PATENTS

| | | |
|---|---|---|
| Re. 24,396 | Rumsey | Nov. 26, 1957 |
| 2,248,687 | Nakahiro | July 8, 1941 |
| 2,827,743 | Rumsey | Mar. 25, 1958 |
| 2,840,962 | Stremke | July 1, 1958 |
| 2,954,654 | Arvidson | Oct. 4, 1960 |